UNITED STATES PATENT OFFICE.

ARTHUR ZART, OF VOHWINKEL, NEAR ELBERFELD, GERMANY, ASSIGNOR TO FARBENFABRIKEN VORM. FRIEDR. BAYER & CO., OF ELBERFELD, GERMANY, A CORPORATION OF GERMANY.

AZO DYE.

1,032,797.  Specification of Letters Patent.  Patented July 16, 1912.

No Drawing.  Application filed June 6, 1911.  Serial No. 631,554.

*To all whom it may concern:*

Be it known that I, ARTHUR ZART, doctor of philosophy, chemist, citizen of the German Empire, residing at Vohwinkel, near Elberfeld, Germany, have invented new and useful Improvements in New Azo Dye, of which the following is a specification.

My invention relates to the manufacture and production of new disazo coloring matters having most probably the following general formula:

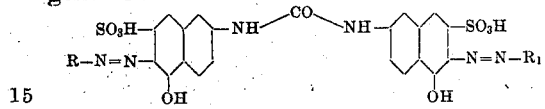

R and $R_1$ meaning arylcarbonyl-2-amino-5-naphthol-7-sulfonic acid, such as benzoyl- or anisoyl-2-amino-5-naphthol-7-sulfonic acid, etc. Of course two different molecules of these compounds can be used. The dyes are obtained by combining two molecules of diazotized 2-amino-aryl-carbonyl-amino-5-naphthol-7-sulfonic acids with the symmetrical urea of 2.5.7-amino-naphthol sulfonic acid.

The new dyes are after being dried and pulverized in the shape of their alkaline salt reddish powders easily soluble in water. They yield upon reduction with stannous chlorid and hydrochloric acid an aminoarylcarbonyl-2-amino-5-naphthol-7-sulfonic acid and the urea of 2.6-diamino-5-naphthol-7-sulfonic acid. They dye cotton orange to red shades which can be combined on fiber with diazotized para-nitranilin from orange red to scarlet shades being thus obtained which are fast to washing and can be discharged to a good white.

In order to illustrate the new process more fully the following example is given, the parts being by weight:—716 parts of 2-paraaminobenzoylamino-5-naphthol-7-sulfonic acid are diazotized and the resulting diazo compound is combined with a solution of 504 parts of the symmetrical urea of 2-amino-5-naphthol-7-sulfonic acid:

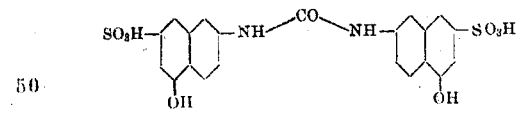

containing an excess of sodium acetate. When the combination is complete the product of the reaction is slowly rendered alkaline by the addition of sodium carbonate; it is then heated and the disazo dye is salted out. It is after being dried and pulverized in the shape of its sodium salt a dark reddish powder, soluble in water with an orange color and soluble in concentrated sulfuric acid with a bluish-red color. By reduction with stannous chlorid and hydrochloric acid the dye is decomposed, 2-paraaminobenzoylamino-5-naphthol-7-sulfonic acid and the symmetrical urea of 2.6-diamino-5-naphthol-7-sulfonic acid are obtained. It dyes cotton orange-red shades, changing into a pure yellowish-scarlet by development with diazotized para-nitranilin. The shade thus obtained is fast to washing and can be discharged to a pure white with hydrosulfite.

The disazo dye obtained from 2-meta-aminobenzoylamino-5-naphthol-7-sulfonic acid dyes cotton orange-red yielding a scarlet by developing the dyed fiber with diazotized para-nitranilin. On using meta-amino-para-anisoyl-2-amino-5-naphthol-7-sulfonic acid somewhat more bluish shades are obtained.

I claim:—

1. The herein described new disazo dyestuffs having most probably the formula:

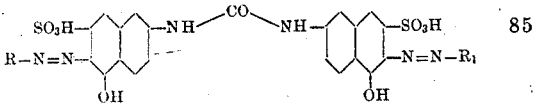

(R and $R_1$ meaning 2-arylcarbonylamino-5-naphthol-7-sulfonic acid) which are after being dried and pulverized in the shape of their alkaline salts reddish powders easily soluble in water: yielding upon reduction with stannous chlorid and hydrochloric acid an aminoarylcarbonyl-2-amino-5-naphthol-7-sulfonic acid and the urea of 2.6 diamino-5-naphthol-7-sulfonic acid; dyeing cotton orange to red shades which can be combined on fiber with diazotized para nitranilin from orange-red to scarlet shades which are fast to washing and can be discharged to a pure white, substantially as described.

2. The herein described new disazo dyestuff having most probably the formula:

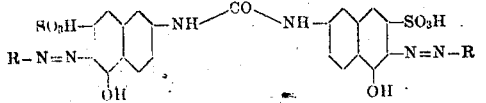

(R meaning 2-benzoylamino-5-naphthol-7- sulfonic acid) which is after being dried and pulverized in the shape of its sodium salt a dark reddish powder, soluble in water with an orange color and soluble in concentrated sulfuric acid with a bluish-red color; yielding upon reduction with stannous chlorid and hydrochloric acid 2-para-aminobenzoylamino-5-naphthol-7-sulfonic acid and the symmetrical urea of 2.6-diamino-5-naphthol-7-sulfonic acid; dyeing cotton orange-red shades, changing into a pure yellowish scarlet by development with diazotized paranitranilin which are fast to washing and can be discharged to a pure white with hydrosulfite, substantially as described.

In testimony whereof I have hereunto set my hand in the presence of two subscribing witnesses.

ARTHUR ZART. [L. S.]

Witnesses:
ALFRED HENKEL,
ALBERT F. NUFER.